Figure 1:
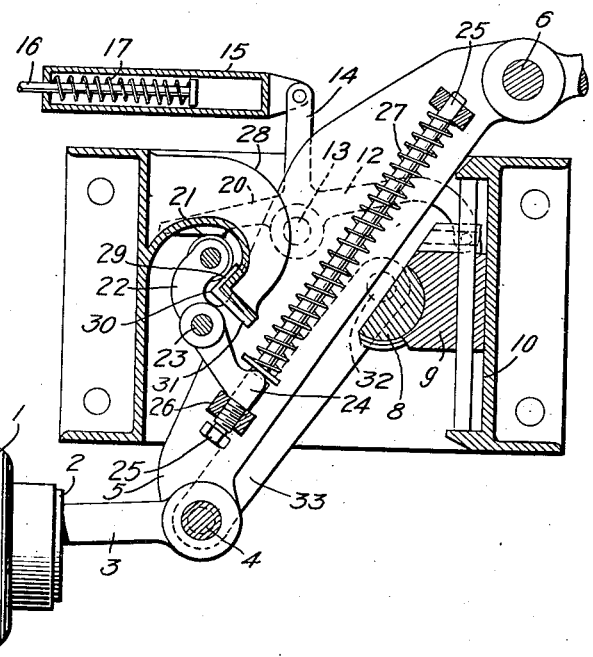

Sept. 4, 1945.  R. H. NILSSON  2,384,257
VEHICLE BRAKE
Filed March 9, 1943  2 Sheets-Sheet 1

Inventor
R. H. Nilsson
By C. F. Wandworth
Attorney

Sept. 4, 1945.　　　　R. H. NILSSON　　　　2,384,257
VEHICLE BRAKE
Filed March 9, 1943　　　2 Sheets-Sheet 2

Inventor
R. H. Nilsson
By [signature]
Attorney.

Patented Sept. 4, 1945

2,384,257

UNITED STATES PATENT OFFICE 2,384,257

VEHICLE BRAKE

Ragnar Hjalmar Nilsson, Malmo, Sweden, assignor to Svenska Aktiebolaget Bromsregulator, Malmo, Sweden, a corporation of Sweden Application March 9, 1943, Serial No. 478,534
In Sweden February 27, 1942

6 Claims. (Cl. 188—198)

In vehicle brakes it is often desirable, for obtaining a high braking effort by a relatively small brake power, to provide for a high brake applying leverage of the brake rigging which transmits the brake power from the source thereof to the brake shoes. Especially in modern railway vehicle brakes the brake applying leverage between the piston of the brake cylinder and the brake shoes is often made variable so that the brake can be set for different brake applying leverages according to the load of the vehicle, and the brake applying leverage corresponding to fully loaded vehicle is often given a high value. When providing for a high brake applying leverage of the brake rigging the difficulty is encountered that the brake shoe clearance at released brake has to be made proportionately small in order to retain the stroke of the piston in the brake cylinder within allowance limits. When the brake shoe clearance is small the brake shoes, however, have a tendency to slide against the wheels at released brake, and this results in an undesirable increase of the resistance against the running movement of the vehicles.

In order to avoid this difficulty several devices have been proposed with a view to obtain a larger brake shoe clearance at released brake than normally would correspond to the high brake applying leverage. These devices are generally based on the principle of using a lower brake applying leverage during the application of the brake, that is during the first part of the braking movement until the brake shoes have been moved over their clearance into contact with the wheels, and of then automatically setting this lower brake applying leverage out of action and setting the final higher brake applying leverage into action for producing the pressure of the brake shoes against the wheels. During release of the brake the same course is repeated in the revrse direction so that the lower brake applying leverage is set into action for moving the brake shoes away from the wheels and so that, as a result hereof, the brake shoe clearance becomes larger than if the higher brake applying leverage had been in action during the whole brake releasing movement.

In most of the several devices already proposed for the realization of the above principle use is made of a spring for retaining a provisional brake lever fulcrum in action as long as the brake rigging is not subjected to braking stress. When braking stress arises in the brake rigging the spring yields and, as a result hereof, a final brake lever fulcrum, other than said provisional brake lever fulcrum, is set into action for producing the desired final brake applying leverage. This device has the drawback that it is uncertain in its action if the brake rigging should be heavy to move or if otherwise an unusual resistance against its movement should arise, for instance due to it having been covered with dirt, ice, etc. If such an unusual resistance occurs a yielding of the spring by which the final brake lever fulcrum will be set into action, may take place too early at a braking operation. It has, therefore, also been proposed to make use of a link or like mechanism for positively retaining the provisional brake lever fulcrum in action, said mechanism being arranged to be set out of action by mechanical means when the brake piston passes a certain position of its stroke. Such a link mechanism, however, is rather complicated and must be of a heavy construction because, under circumstance, it may be subjected to the whole braking stress and, furthermore, it is set out of action with a jerk and is normally subjected to a certain stress when this occurs, which all is detrimental to the desirable smooth application of the brake. In this respect an exception, however, must be made for a proposed device providing hydraulic means for setting the brake lever fulcrums into and out of action, but this device makes the construction of the mechanism still more complicated.

This invention has for its object to provide a simplified device for obtaining a larger brake shoe clearance in brakes having provision for a high final brake applying leverage and means for positively retaining a provisional brake lever fulcrum in action until the brake reaches a certain position of its stroke at a braking operation. The generic characterizing features of the invention are as follows: the provisional brake lever fulcrum is provided for by two coacting abutments on the brake lever and a support for the same; one of these coacting abutments is constructed as a track and more particularly as a rolling-surface or gliding-surface for the other which is constructed as a roller or glide-shoe; said track has a bend; and means are provided for guiding the brake lever and said support in such a manner in respect of their said coacting abutments in relation to each other that said roller or glide-shoe during application of the brake moves along said track and reaches the bend thereof in a certain position of the application stroke of the brake and at continued application movement of the brake beyond said position passes the bend of said track for permitting said brake lever to be turned into operative contact with its final fulcrum. By this arrangement several important advantages are gained. Thus there is no need for a special mechanism for setting the provisional brake lever fulcrum out of action, and by giving a suitable slope to the track beyond the bend thereof it is avoided that the setting of the provisional brake lever fulcrum out of action takes place with a jerk, and thus no shocks will occur in the application of the brake.

In order that the invention may be fully understood two embodiments thereof are illustrated in the accompanying drawings in which—

Figure 2:
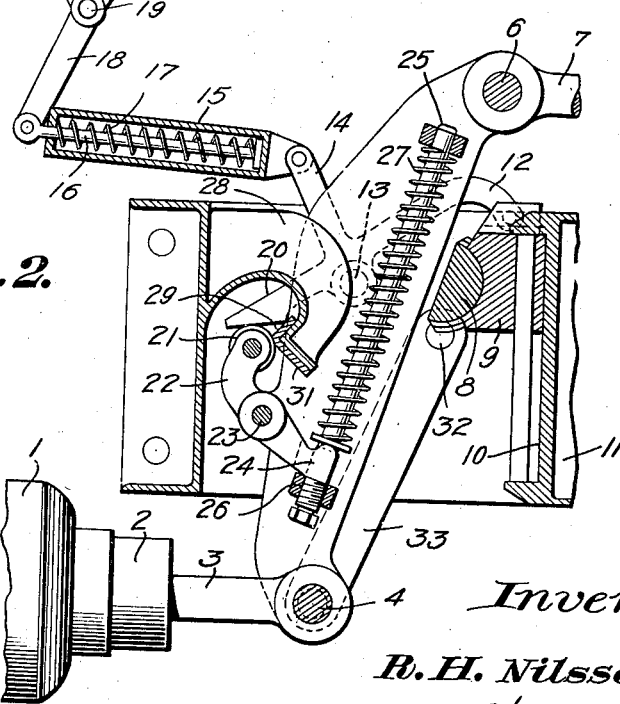
Figure 3:
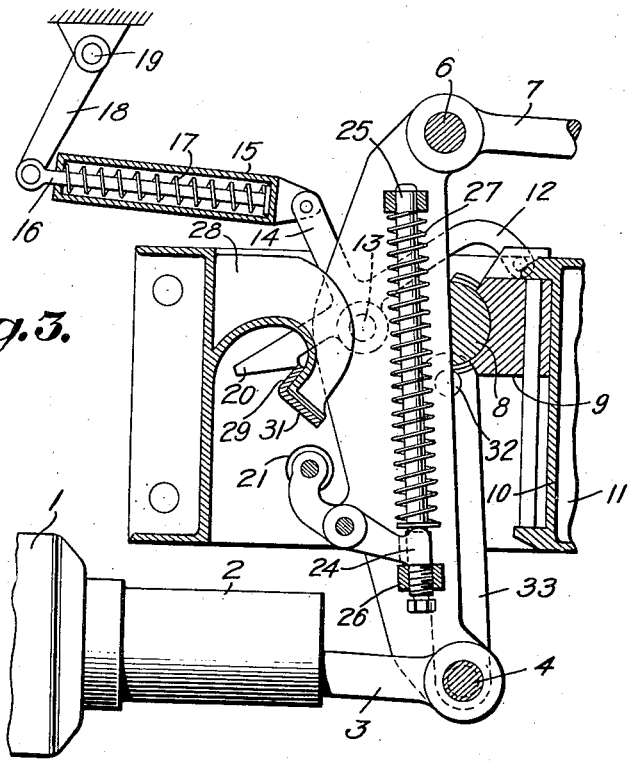

Figs. 1 to 3 illustrate an embodiment of the invention applied to a variable leverage brake rigging of the type disclosed in the U. S. Patent No. 2,204,925, Figs. 1 to 3 being plan views, partly in section, with the parts in different positions.

Figure 4:
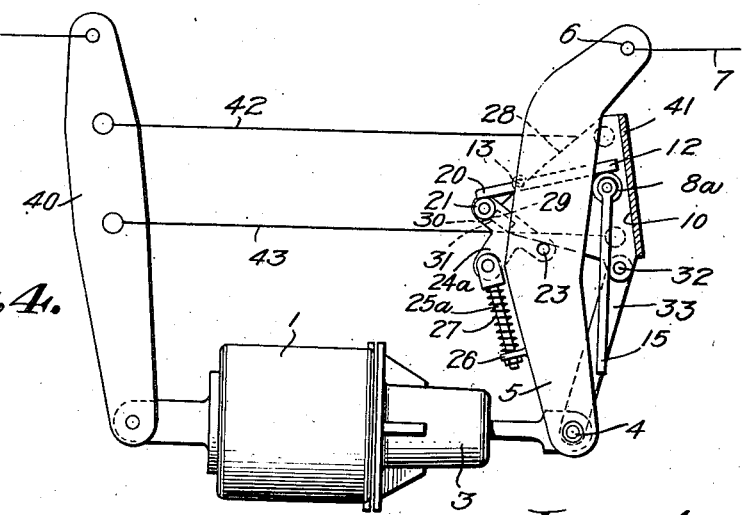

Fig. 4 is a plan view, partly in section, of an embodiment of the invention applied to a variable leverage brake rigging of the type disclosed in the U. S. Patent No. 1,898,528.

Referring first to Figs. 1 to 3, 1 denotes a brake cylinder, 2 the usual brake piston sleeve, and 3 the brake piston rod which by means of the bolt 4 is connected to one end of a variable leverage brake lever 5 to the other end of which a bolt 6 connects a brake pull rod 7 of the brake rigging. The final fulcrum for the brake lever 5, that is the fulcrum which is operative during the pressing of the brake shoes against the wheels, after the brake shoes have been moved into contact with the wheels, comprises an abutment 8 rotatably mounted in a block 9 which in turn supports itself against a sliding-surface 10 formed on a frame-work 11 which is secured to the under-frame of the vehicle. The block 9 is movable along the sliding-surface 10 by means of an arm 12 the hub of which is journalled on a shaft 13 in the frame-work 11 and provided with a second arm 14 projecting beyond the frame-work 11 and linked to one end of a two-part rod 15, 16 the two parts of which are extendible in relation to each other against the action of a spring 17. Figs. 2 and 3 show the two-part rod in its normal position, and Fig. 1 shows the same in extended position. The other end of the two-part rod is linked to an arm 18 on a setting shaft 19. In Figs. 2 to 3 the shaft 19 and arm 18 are set in the position corresponding to the highest obtainable final brake applying leverage which is to be used when the vehicle is fully loaded. The hub of the arms 12 and 14 is provided with a third arm 20 which in the position shown in Fig. 1 supports itself against a roller 21 which by means of the said arms holds the spring 17 in a compressed state and the block 9 in a position substantially midway between the ends of the sliding-surface 10.

The roller 21 is rotatably mounted on an arm 22 pivoted to the brake lever 5 by a bolt 23. The arm 22 has a bifurcated extension 24 straddling a long guiding pin 25 and supporting itself against a lug 26 on the lever 5, against which it is pressed by a compressed spring 27. Thus the position of the roller 21 in relation to the brake lever 5 is fixed as long as the roller is not acted upon by forces of such a magnitude that the spring 27 must yield.

Projecting from the frame-work 11 is a supporting arm 28 provided with a rolling-surface 29 against which the roller 21 supports itself in the position shown in Fig. 1. The rolling-surface 29 has a bend at 30 so that the extension 31 of the rolling-surface beyond this bend takes another direction than the first portion 29 of the rolling-surface.

The operation of the device is as follows. At released brake, as shown in Fig. 1, the position of the brake lever 5 is determined by the bolt 4 taking the left end position of its stroke, and by the roller 21 abutting the fixed surface 29. In this position the bolt 6 has reached a point so far to the right in Fig. 1 that there is no room for the abutment 8 and the block 9 to take the position corresponding to the highest obtainable final brake applying leverage (that is the end position nearest to the bolt 6), and this is the cause of making the arrangement such that, as above described, the roller 21 by means of the arms 20 and 12 holds the block 9 in a position somewhere towards the other end of the sliding-surface 10.

When starting a brake application movement the piston sleeve 2, piston rod 3, and bolt 4 move to the right in Fig. 1, whereby the brake lever 5 is rotated in the anti-clockwise direction with the roller 21 serving as a provisional fulcrum for the lever during this first rotation thereof, whereby the bolt 6 and the brake pull rod 7 are moved speedily to the left for moving the brake shoes near up to the wheels. The bolt 4 is guided in a path in the form of an arc of a circle by means of a link rod 33 connecting the bolt 4 to a fixed pin 32, and hereby the roller 21 is compelled to move along the surface 29 during the now described application movement of the brake lever. The construction of the surface 29 is such that the roller 21 has reached the bend 30 of the surface when the brake lever has been rotated sufficiently for providing room for the abutment 8 to take the highest brake applying leverage position. At the same time the roller 21 has made room for the arm 20 so as to permit the spring 17 to expand and move the block 9 into the highest brake applying leverage position as shown in Fig. 2.

At the beginning of the continued brake application movement the roller 21 will roll along the deflected extension 31 of the surface 29. This extension 31 is so arranged that at this stage of the movement the bolt 6 and brake pull rod 7 will be moved only a trifling amount further to the left. Hence it follows that the brake lever 5 is turned into operative abutting contact with the abutment 8. When this contact is established the final high brake applying leverage is set into action for pressing the brake shoes against the wheels, and at the rotation of the brake lever about the abutment 8 the roller 21 moves away from its rolling surface 29, 31 as shown in Fig. 3.

At release of the brake the same course is repeated in the reverse direction: the roller 21 is moved towards the deflected extension 31 of the surface 29 and reaches this extension substantially in the same moment in which the braking stress in the brake rigging ceases; during the movement of the roller 21 back to the apex of the bend 30 the bolt 6 remains in substantially unchanged position so that the brake lever 5 is moved away from the abutment 8; during the movement of the roller 21 from the bend 30 to the original position on the surface 29 the bolt 6 is moved speedily to the right so that a large brake shoe clearance is obtained, and simultaneously the abutment 8 and block 9, should they have been in, or near, the position corresponding to the highest obtainable final brake applying leverage, are moved away from this position by the arm 20 so as to provide room for the brake lever 5 to return into fully released position.

The correct function of this device presupposes that the brake shoe clearance at released brake always is of a correctly adjusted size, such as is obtainable by the provision of an automatic slack adjuster in the brake rigging. The automatic slack adjuster preferably should be of a double-acting type which gives the greatest security against the brake shoe clearance becoming too small. Should the slack adjuster not be double-acting, or should for any other reason the brake shoe clearance possibly become too small, the spring 27 will do service. This spring 27 is provided as a measure of safety for the following reason. Should the brake shoe clearance become so small that the brake shoes reach into contact with the wheels at such an early stage of a brake application movement that the roller 21 still is on the first part of the rolling surface 29, the brake power will be transmitted from the brake cylinder 1 to the brake pull rod 7 by the brake lever 5 turning about the roller 21. This is not so serious because the roller 21, arm 22 and supporting arm 28 easily enough can be constructed so as to stand for the stresses to which they then will be subjected. But the state of things will alter when the roller 21 has passed the bend 30 and comes on the part 31 of the rolling surface. Due to wedging on this part of the rolling surface several parts of the device would be subjected to so great stresses that it would be necessary to make the device very heavy and bulky. Due to the spring 27, however, the arising stresses are limited by the roller 21 being permitted to recede in the direction towards the bolt 4, should the pressure of the roller 21 against the surface portion 31 become too great. At this receding of the roller 21 the arm 24 moves away from the lug 26 under compression of the spring 27, so that the brake lever 5 can turn into abutting contact with the abutment 8 and the braking then can take place in a normal manner. It follows that the spring 27 functions only in a case such as the above described, but not when the brake shoe clearance is of its normal value, or too large. Should the brake shoe clearance become too large, obviously the only consequence hereof is a corresponding increase of the application stroke of the brake piston, and it is the object of the slack adjuster to set this right.

The embodiment shown in Fig. 4, illustrates the invention as applied to a brake rigging of the type in which a floating brake lever 40 is coupled to the live brake lever 5 by means of an auxiliary lever 41, two tie rods 42 and 43 connecting the floating lever 40 to the auxiliary lever 41, and an abutment or fulcrum member 8a which serves the purpose of supporting the live brake lever 5 against the auxiliary lever 41 and is movable along the latter. In this embodiment the abutment or fulcrum member 8a, which preferably is constructed as a roller, corresponds to the slidable brake lever support 8, 9 coacting with the surface 10 in the form of Figs. 1 to 3. In Fig. 4 the surface 10 is provided on the auxiliary lever 41 which also is provided with the supporting arm 28 carrying the surface 29, 31 having the bend 30. The arm 22 carrying the roller 21 is pivoted at 23 to the brake lever 5 and provided with a projection 24a linked to one end of a pin or bolt 25a which is guided in the lug 26 on the lever 5 and acted upon by the compressed spring 27. The guiding link rod 33 connects the bolt 4 to the auxiliary lever 41, or the supporting arm 28 thereon, and is pivoted thereto by the bolt 32. The lever 12, 20 is pivoted by its shaft 13 to the supporting arm 28, and the rod 15 which serves the purpose of moving and setting the roller 8a, is directly connected with the latter.

Parts denoted by corresponding numerals in Figs. 1 to 3 and in Fig. 4 correspond to each other as regards their purpose and function. Thus the function of the form of Fig. 4, being principally the same as the function of the form of Figs. 1 to 3, requires no special description.

The invention is not limited to the forms herein shown and described for the purpose of illustration, since many modifications are quite possible without departing from the spirit of the invention.

What I claim and desire to secure by Letters Patent is:

1. Brake mechanism for a wheeled vehicle, comprising a brake lever for transmitting brake power from a source of such power to brake shoes for coaction with the wheels of the vehicle, means providing a provisional fulcrum for said brake lever during movement thereof for moving the brake shoes into and out of contact with the wheels at application and release of the brake, respectively, means providing a final fulcrum, other than said provisional fulcrum, for said brake lever during movement thereof for pressing the brake shoes against the wheels when in contact therewith during a braking operation, said means providing the provisional fulcrum comprising a support and means including a roller movably mounted on said brake lever and a guide for said roller mounted on said support, means for maintaining said roller and guide in engagement with each other during a portion of the movement of said brake lever, and means for effecting engagement of said brake lever and final fulcrum upon disengagement of said roller and guide.

2. Brake mechanism according to claim 1, said roller being resiliently mounted whereby it may yield under undue stress.

3. Brake mechanism according to claim 1, said roller being carried on an arm pivoted to said brake lever, and spring means yieldingly holding said roller against said guide.

4. Brake mechanism according to claim 1, the means providing said final fulcrum being provided with a sliding-surface along which said final fulcrum is slidable, said support being fixed relative to said sliding surface.

5. Brake mechanism according to claim 1, the means providing said final fulcrum being provided with a sliding-surface along which said final fulcrum is slidable, and spring means for moving said final fulcrum along said sliding-surface, said support being fixed relative to said sliding surface.

6. Brake mechanism according to claim 1, the means providing said final fulcrum being provided with a sliding-surface along which said final fulcrum is slidable, spring means for moving said final fulcrum along said sliding surface in one direction, and means operable by said brake lever for positively moving said final fulcrum against the action of said spring means at the release of the brake after a braking operation, said support being fixed relative to said sliding surface.

RAGNAR HJALMAR NILSSON.